Sept. 30, 1958      K. C. ALLISON      2,854,554

ELECTRIC SWITCH STATOR ASSEMBLY

Filed March 1, 1956

INVENTOR.
Kenneth C. Allison
BY
Atty.

United States Patent Office 2,854,554
Patented Sept. 30, 1958

2,854,554

ELECTRIC SWITCH STATOR ASSEMBLY

Kenneth C. Allison, Crystal Lake, Ill.

Application March 1, 1956, Serial No. 568,755

1 Claim. (Cl. 200—166)

The present invention relates to a stator assembly for electric switches and particularly to switches of the type shown in applicant's copending application Serial No. 512,517 wherein an arcuate conductive segment and an insulating wafer or base are secured in juxtaposed laminar arrangement to provide variable inductance means for selective engagement by a switch element such as a rotary contact member associated with the stator assembly.

An object of the present invention is to provide a stator assembly made up of an insulating wafer or base and a preformed sheet metal segment or segments in juxtaposed laminar arrangement with improved means for establishing a rigid assembly of said wafer and each segment.

An important feature of the invention is the provision of an improved joint between the base and each segment comprising a non-circular hole formed in the base and an ear formed integrally with the segment adapted to be projected into said hole in the base and then secured therein by bending or spreading the ear so as to anchor the same in the walls of the hole.

The foregoing and other objects and features of the invention will be understood better from the following detailed description taken in connection with the accompanying drawings, wherein.

Figure 1:
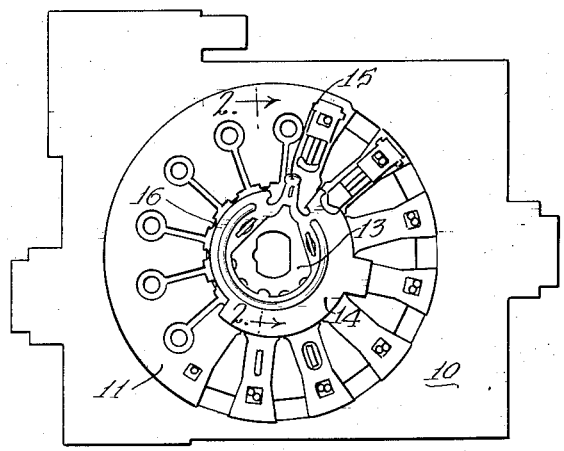
Fig. 1 is an elevation of a switch embodying a stator assembly in accordance with the present invention.
Figure 2:
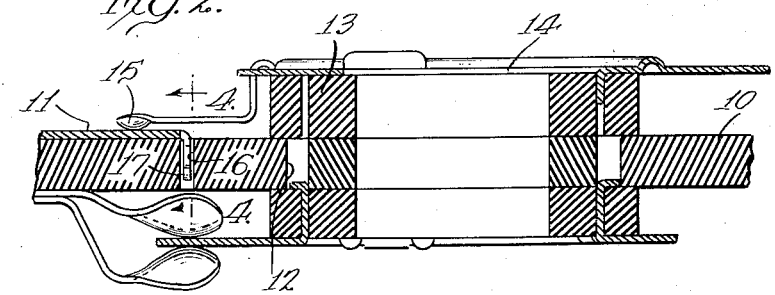
Fig. 2 is an enlarged fragmentary section taken on line 2—2 of Fig. 1.

Referring more particularly to Figure 1, there is shown by way of illustration an electrical switch such as used in a television tuner for selectively tuning a television receiver to a plurality of signal channels. As so shown, the switch includes a base 10 of insulating material and a series of electrical inductance tuning elements including an arcuate conductive segment 11. The base 10 is also shown as provided with an opening 12 for receiving a rotor 13 which is supported for rotation in the opening 12. A conductive blade or ring 14 fixed to the rotor 13 is selectively engageable with the tuning elements on the face of the stator 10 facing the rotor blade 14 through a resilient finger 15 forming an extension of said rotor blade.

Figure 3:
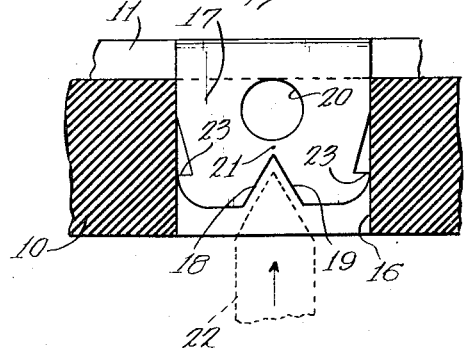
Fig. 3 is an enlarged fragmentary detail view showing the insulating wafer and a conductive segment in assembled relation preparatory to final joining of the parts in rigid assembly.
Figure 4:
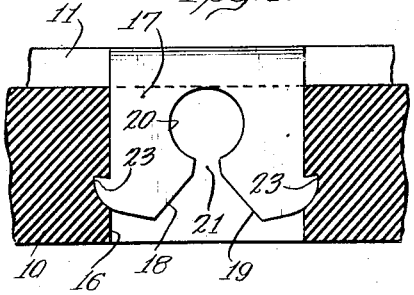
Fig. 4 is a similar view showing the parts in finally joined relation.

Preparatory to joining the segment 11 and the stator 10 in fixed assembly the stator is punched or otherwise formed with openings 16 arranged in circumferentially spaced apart relation concentric with the axis of rotation of the rotor 13 and spaced radially inwardly of the circular path travelled by the segment engaging end of the resilient finger 15 as the latter is moved in unison with the rotor. The openings or slots 16 thus provided in the stator 10, as shown in Fig. 3 intersect opposite faces of the stator. Each opening is of such size as to freely accept for insertion therein an angularly bent ear 17 formed integrally with the segment and the ear 17 is of such dimension as to extend a distance less than the distance between opposite faces of the stator. Each ear 17 is divided lengthwise of the distance between opposite faces of the stator by a notch presenting inwardly slanting edges 18 and 19. The inner terminus of the notch is joined to a circular opening 20 by a relatively short slit 21. The division thus provided by the notch, the slit 21 and the circular opening is adapted to be acted upon by a spreading tool 22 introduced into the opening 16 at the end thereof opposite to that surrounded by the surface engaged by the conductor segment of which the ear 17 forms an integral part and the tool cooperating with the slanting edges 18 and 19 to cause the ear to spread in opposite directions. Upon such spreading of the portions of the ear divided by the notch, slit and circular opening, a prong 23 forming an integral projection at each edge of the ear facing the side walls of the opening 16 is forced into biting engagement with the wall of the opening opposite thereto.

Thus the ear 17 provides a fastening through which the conductor segment is rigidly anchored to the base and yet leaving the face of the base 10 opposite the face containing the conductor segment free of any projection by said ear whereby opposite faces of the stator base may be provided with conductor segments in non-conductive relation to each other.

The present invention accordingly provides a simple and inexpensive assembly in which the stator and a metal conductive layer may be easily, rapidly and securely assembled in a rigidly joined state.

What is claimed is:

A stator assembly for electric switches including a flat dielectric base member and a preformed sheet metal blank in juxtaposed laminar arrangement, said base member having an opening intersecting opposite faces of said base member and means for joining the blank and base member in rigid assembly including an ear formed integrally with said blank and projecting into said opening in the base member a distance less than the distance between opposite faces of said base member, said ear being centrally divided lengthwise of its projection into said opening by a line of severance having its outer terminus in the form of a notch presenting inwardly slanting edges adapted to cooperate with a spreading tool to spread the sections of the ear on opposite sides of the notch into biting engagement with the wall of the opening containing the ear and its inner terminus in the form of an enlarged circular perforation.

References Cited in the file of this patent

UNITED STATES PATENTS 1,608,070  Leppert _____ Nov. 23, 1926
2,186,950  Allison et al. _____ Jan. 16, 1940